Figure 1:
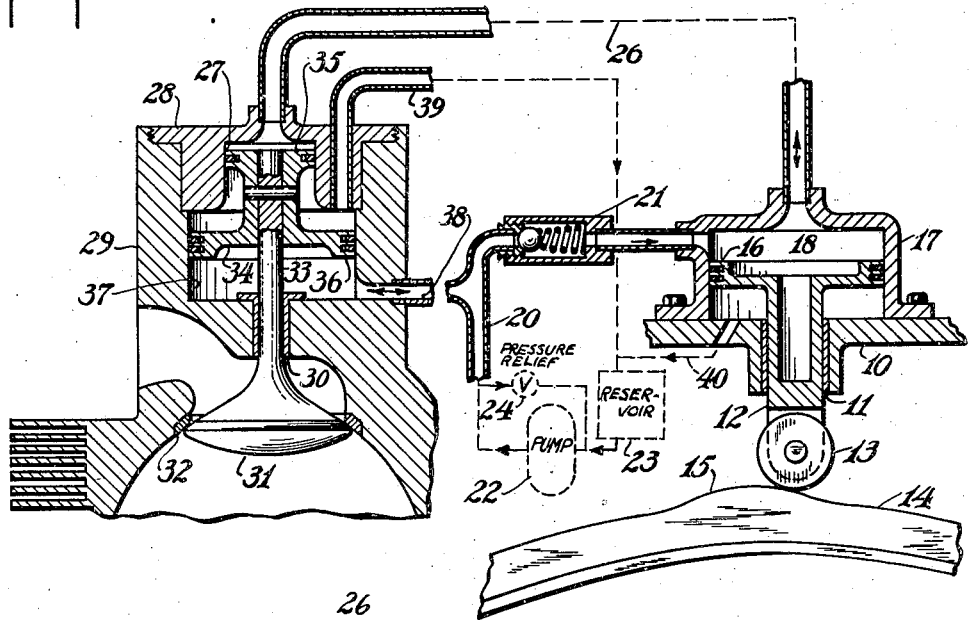

Sept. 14, 1943.    E. C. STEINER    2,329,662

HYDRAULIC VALVE GEARS

Filed Nov. 12, 1941

INVENTOR
Edward C. Steiner.
BY
ATTORNEY

Patented Sept. 14, 1943

2,329,662

UNITED STATES PATENT OFFICE 2,329,662

HYDRAULIC VALVE GEAR

Edward C. Steiner, Fairlawn, N. J., assignor to Wright Aeronautical Corporation, a corporation of New York Application November 12, 1941, Serial No. 418,639

8 Claims. (Cl. 123—90)

This invention relates to valve operating mechanisms for engines and is particularly concerned with improvements in hydraulically actuated valve gear suitable for use in aircraft or other internal combustion engines.

It is known that the prior art shows means for actuating valves hydraulically, wherein an impulse generator is operated by an engine cam, the impulses being transmitted hydraulically to a hydraulic motor associated with the engine valve. The subject invention utilizes this principle but improves upon it by providing hydraulic means for closing the valve which operates in conjunction with the valve opening mechanism.

An object of the invention is to provide a valve operating mechanism in which the valve is opened and closed hydraulically. A further object of the invention is to provide a hydraulic impulse generator to open the valve against a substantially constant hydraulic valve closing force. A further object of the invention is to provide valve operating mechanism which occupies substantially less bulk than the conventional push rod opened and spring closed types of engine valves conventionally used. A further object is to provide a valving system in connection with the hydraulic valve operating mechanism by which a continual flow of hydraulic fluid is maintained through the system, leakage from the system being returned to the hydraulic fluid supply.

Figure 2:
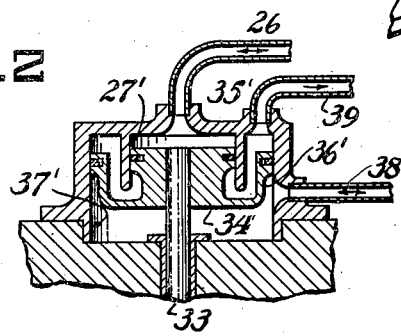

Further objects of the invention will become apparent in reading the annexed detailed description in connection with the drawing, in which:

Fig. 1 is a section through a valve motor and a cam operated impulse generator in association with a hydraulic supply system shown diagrammatically; and Fig. 2 is a fragmentary section through an alternative arrangement of valve operating motor.

First referring to Fig. 1, a support structure 10, such as an engine crankcase, carries a cam follower guide 11 in which a cam follower 12 is reciprocable, the lower end of the cam follower having journalled therein a roller 13 for engagement with an engine cam 14 provided with a lobe 15. The upper end of the cam follower 12 is formed as a piston 16 fitted to a cylinder 17 secured to the structure 10 to comprise a hydraulic impulse generator. The piston 16 defines with the cylinder 17 a hydraulic cavity 18 which is supplied with hydraulic fluid from a conduit 20 through a check valve 21, the conduit 20 being connected to the output of a pressure pump 22 supplied from a reservoir 23. A pressure relief valve 24 bridges the pump 22 to maintain a substantially constant pump outlet pressure.

The cylinder cavity 18 communicates through a pipe 26 with a cylinder 27 formed in a member 28 secured to a cylinder head 29 which is provided with a valve guide 30 concentric with the cylinder 27. A valve 31 engages a seat 32 formed in the cylinder head and the valve includes a stem 33 to which is secured a differential piston 34 having a small piston 35 fitted to the cylinder 27 and a large piston 36 fitted to a relatively large cylinder 37 formed in the cylinder head. The large cylinder 37 communicates at 38 with the pump output conduit 20. The space between the pistons 35 and 36 is vented to the reservoir 23 through a pipe 39.

Since pump pressure is imposed continually within the cylinder 37 and upon the large piston 36, valve closing force is continuous and is proportional to the area of the piston 36 and the pump delivery pressure. In virtue of the check valve 21, the cylinder 17, the pipe 26 and the cylinder 27 are maintained full of oil at all times under pump pressure. When the cam lobe 15 raises the cam follower 12, the pressure in the cylinder 17 is raised well above pump pressure, the hydraulic fluid being prevented from escape by the check valve 21. This pressure rise acts upon the top of the piston 35, opening the valve 31 against the constantly exerted closing pressure exerted by pressure fluid in the cylinder 37. As the valve opens, fluid in the cylinder 37 must back up and escapes from the system through the pressure relief valve 24. As soon as the cam follower 12 passes the cam lobe 15, high valve opening pressure is relieved and immediately the valve is closed by pressure upon the piston 36.

Any leakage past the piston 16 runs to the reservoir 23 through a passage 40 and any leakage past the pistons 35 or 36 also returns to the reservoir 23, through the pipe 39.

Thus, a fully hydraulic valve operating system is provided without recourse to springs or other mechanical devices for either valve opening or valve closing.

In Fig. 2 I show an alternative arrangement of differential piston wherein the valve opening cylinder 27' is partly coextensive in length with the valve closing cylinder 37'. The differential piston assembly 34' is constructed so that the small piston 35' is substantially coplanar with the large piston 36', thereby reducing the axial length of the differential piston and cylinder assembly. Such reduction in length is important in aircraft engines to permit of reduction in engine height, or in engine diameter in the case of radial cylinder engine types.

In practice, the hydraulic fluid pressure in the passage 20 will be derived from the pressure oil supply pump of the engine proper which usually delivers oil at a pressure of the order of 100 pounds per square inch. Assuming such pressure as an example, the net cross sectional area of the cylinder 37 would be around 3½ square inches to secure a valve closing force of 350 pounds which is typical for a large aircraft engine. The valve opening force is considerably in excess of this value and is derived from the positive displacement of the cam follower piston 16 and the small valve piston 35. The area ratio between the cam follower piston 16 and the valve piston 35 is chosen in accordance with the height of the cam lobe 15 and the valve lift needed. Obviously, the valve lift may be greater or less than the cam lobe height accordingly as the piston 35 is smaller or larger than the piston 16. It is essential that the piston 35 be smaller than the piston 36 since pump pressure is always exerted upon the piston 35 through the check valve 21. Thus, where "net area" of the cylinder 37 was referred to above, this net area would be the difference in area between the piston 36 and the piston 35, less the diameter of the valve stem 33.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine valve operating system, a source of fluid under substantially uniform pressure, a second source of fluid under intermittent high pressure, an engine valve having operably connected therewith a first piston-cylinder motor in communication with said first source for urging valve closure, a second piston-cylinder motor operably connected to said valve and communicating with said second fluid source for urging valve opening, and means to maintain said first source of fluid pressure substantially constant and independent of the pressure variations of said second source.

2. In a valve operating system, a valve having operably connected therewith a large and a small piston, a large cylinder to which the large piston is fitted, a small cylinder to which the small piston is fitted, means to impose a substantially uniform pressure within the large cylinder to urge valve closure, means to impose intermittent high fluid pressure impulses within the small cylinder to overcome said uniform pressure and to open said valve, and means to maintain said first source of fluid pressure substantially constant and independent of the pressure variations of said second source.

3. In a hydraulic operating system for an engine valve, large and small cylinders, pistons fitted to said cylinders connected with one another and with the engine valve, a source of substantially uniform fluid pressure connected with the larger cylinder, a cam operated piston, a cylinder to which the last named piston is fitted, a fluid conduit from the latter cylinder to said smaller cylinder, and a one-way fluid feed connection from said source of substantially uniform fluid pressure to the cylinder of said cam operated piston.

4. In a hydraulic operating system for an engine valve, a differential cylinder comprising large and small bores, a differential piston unit fitted to the differential cylinder, an operating connection between the piston and valve, means to maintain a certain unit fluid pressure in both bores of the cylinder, means to apply periodic increments of fluid pressure to the smaller of said bores, and a check valve to prevent communication of said increments of fluid pressure to the larger of said bores.

5. In a hydraulic operating system for an engine valve, opposed large and small cylinders, pistons fitted to said cylinders and movable together, an operating connection to the valve from said pistons, hydraulic inlets under substantially uniform unit pressure leading to both said cylinders, said pistons being urged in one direction due to the differential area thereof upon which the fluid pressure acts, means to apply to said smaller cylinder and piston excess fluid pressure of an order great enough to urge said pistons in the opposite direction, and means to prevent communication of said excess fluid pressure to said larger cylinder and piston.

6. In a hydraulic operating system for an engine valve, a piston unit having opposed faces of different effective areas connected to the end of the valve stem and slidably fitted within a cylinder unit, a source of fluid pressure, the opposed faces of said piston being subjected to said fluid pressure, the pressure on the larger effective face normally maintaining said valve closed against the pressure on the smaller face, means intermittently operable to increase the fluid pressure on the smaller effective piston face to intermittently open said valve, and means to prevent communication of said intermittent pressure increase to the larger effective piston face.

7. In a hydraulic operating system for an engine valve, large and small cylinders, pistons fitted to said cylinders connected with one another and with the end of the valve stem, a source of fluid pressure connected to both of said cylinders, the pressure on the larger piston normally being effective to maintain said valve closed against the pressure on the smaller piston, means intermittently operable to increase the fluid pressure to the small cylinder to intermittently open said valve, and means to prevent said intermittently operable means from affecting the fluid pressure to the large cylinder.

8. In an engine valve operating mechanism, a cylinder head having a valve guide, a valve stem reciprocable therein, said head comprising a cylinder having a large and a small diameter portion, a piston unit having opposed large and small diameter faces slidably fitted within the large and small diameter portions of said cylinder and connected to the end of the valve stem, a pump to supply a pressure fluid to both opposed faces of said piston, the pressure on the larger face normally being effective to maintain said valve closed against the pressure on the small face of the piston, means intermittently operable to increase the fluid pressure on the small face of the piston to intermittently open said valve, and a check valve to prevent said intermittently operable means from increasing the pressure on the large face of the piston.

EDWARD C. STEINER.